United States Patent [19]

Churchill

[11] 4,107,466
[45] Aug. 15, 1978

[54] INDIVIDUAL ROOM ENERGY CONTROL SYSTEM

[75] Inventor: Steven T. Churchill, Wilton, Conn.

[73] Assignee: Letot, Incorporated, Fairfield, Conn.

[21] Appl. No.: 714,848

[22] Filed: Aug. 16, 1976

[51] Int. Cl.² .................................... H04M 11/00
[52] U.S. Cl. .................................... 179/2 A
[58] Field of Search ............... 179/2 R, 2 A; 340/286, 340/147 R; 317/132, 135 R, 135 A

[56] References Cited

U.S. PATENT DOCUMENTS

| | | | |
|---|---|---|---|
| 2,720,254 | 10/1955 | Ward | 317/135 R |
| 3,486,081 | 12/1969 | Kanbar | 317/132 |
| 3,538,255 | 11/1970 | Grundin | 179/2 A |
| 3,614,325 | 10/1971 | Galian | 179/2 A |
| 3,777,065 | 12/1973 | Galian | 179/2 R |
| 3,865,985 | 2/1975 | Stankus | 179/2 A |
| 4,021,615 | 5/1977 | James | 179/2 A |

OTHER PUBLICATIONS

Tele (English Edition) (Sweden), vol. 23, No. 2, Feb. 1971, pp. 31-33, Hans Lardner, "Remote Control of Heating Systems in Weekend Cottages".

Primary Examiner—Kathleen H. Claffy
Assistant Examiner—Joseph A. Popek
Attorney, Agent, or Firm—Pennie & Edmonds

[57] ABSTRACT

An individual room energy control system for selectively disconnecting and connecting electrical load means associated with a room to and from an electrical power source where the system includes a room status switch having room occupied and unoccupied positions located at a room status station for disconnecting the load means with the power means and a manually operated service switch in the individual room which may override the status switch when it is in a room unoccupied position whereby the load may be reconnected to the power source. The service switch may be incorporated in a telephone which in turn is included in a room status circuit to indicate when a room is unoccupied whereby a maid on entering a room for service may connect the load to the power source while she is in the room by operating the telephone.

4 Claims, 2 Drawing Figures

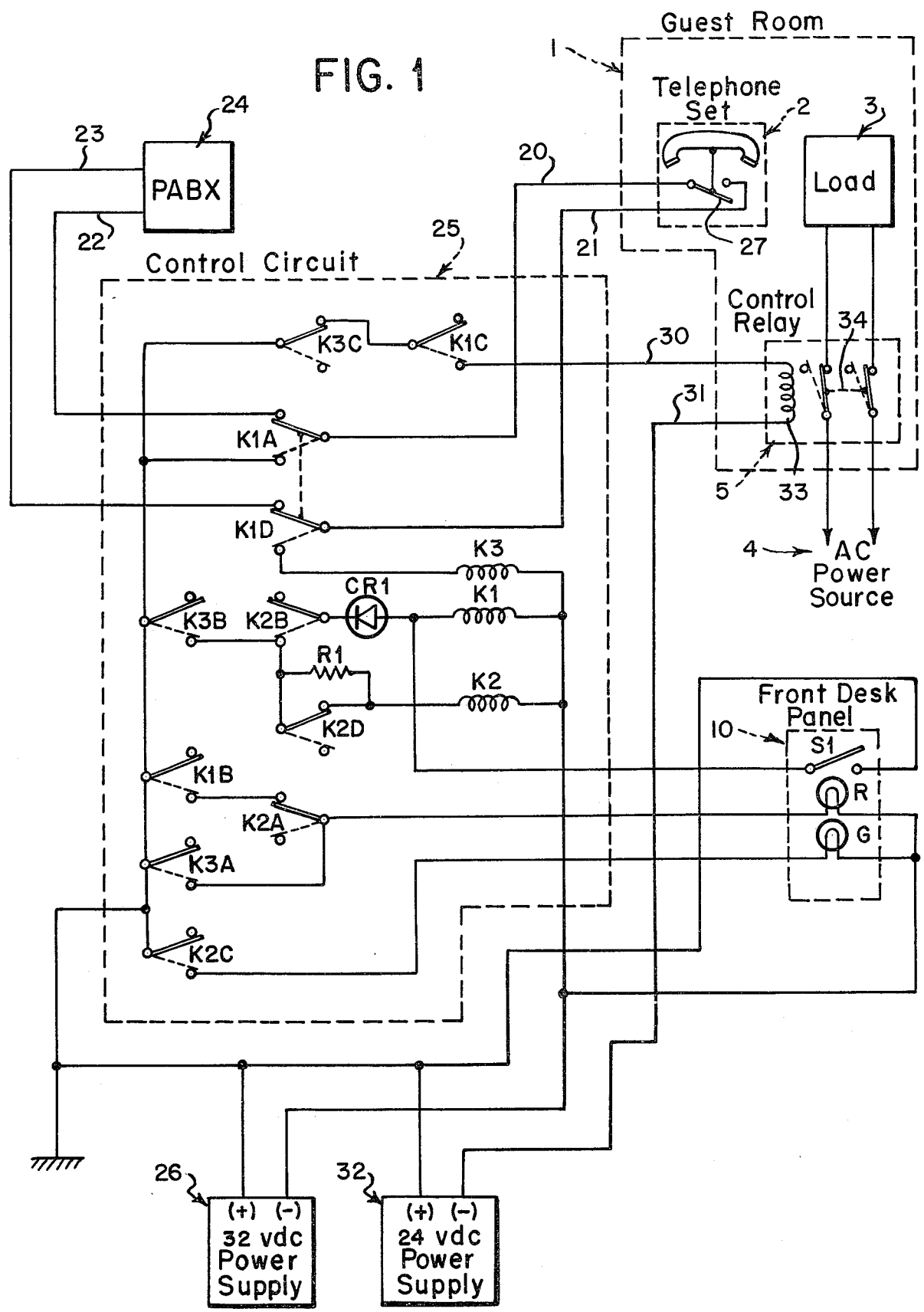

INDIVIDUAL ROOM ENERGY CONTROL SYSTEM

DESCRIPTION OF THE PRIOR ART

The use of a telephone in a hotel or motel room to cause a change in a room status system when a maid enters a room to service the room is known. For example, see the systems disclosed in U.S. Pat. Nos. 3,614,325 and 3,892,922, both of which disclose telephone control systems by which existing telephone lines in motels, hotels or the like may be utilized to give an indication at a central station such as a front desk or housekeeper panel as to whether an individual room is in need of being serviced, is in the process of being serviced or has been serviced.

It is an object of my invention to combine room status systems of the general type as disclosed in the aforementioned patents with further means by which the electrical load in individual hotel or motel rooms, for example heating units or air conditioning units, may be selectively disconnected from their power source by operation of a room status switch at the hotel or motel front desk in order to conserve energy when an individual room is unoccupied. It is a further object of the invention to provide means whereby a maid upon entering the room for service may reconnect the electrical load to the power source during the time that she is within a room for servicing it and upon completion, may again disconnect the electrical load from its power source.

It is a further object of my invention to provide temperature responsive means which upon a predetermined high or low temperature will reconnect the electrical load to its power source notwithstanding any positioning of the individual room status switch to a room unoccupied position to assure that the room temperature never drops below freezing or exceeds an unduly high amount.

GENERAL DESCRIPTION OF THE INVENTION

Broadly an individual room energy control system constructed according to my invention includes a room status station having a plurality of room status switches by which the status of an individual room may be indicated on a panel. The room status switch associated with each room controls, in addition to the room status indicating means, a control switch by which the electrical load in the room may be disconnected from its power source when the room status switch is positioned to a room unoccupied position and connected to the power source when the room status switch is positioned to a room occupied position. A manually operable service switch is included in each individual room by which the control switch associated with that room may be overridden in order that, when a maid enters the room to service it, the load means may be reconnected to its power source. Upon completion of servicing of the room, the maid actuates the service switch to disconnect the load means from its power source. Preferably the manually operable switch is included within a telephone contained in the room which in turn is connected to a room status circuit extending to the room status station when the room status switch is positioned in the room unoccupied position. The service switch may be included in the conventional switch which is closed when a telephone handset is removed from its cradle or may be included in the dial operated means associated with a telphone. Preferably the control switch is a relay operated switch included in a second set of telephone lines that are often installed at the same time the regular telephone lines are installed and both of which extend from the individual room to a central telephone switchboard. In this manner existing telephone wiring may be utilized to provide the individual room energy control system without the necessity of stringing new wires from the room to the room status station.

The invention also contemplates the use of temperature responsive switches in the control circuit containing the relay operated control switch which will break the circuit upon predetermined high and low temperatures. In this manner the temperature of the room will always be kept within acceptable limits, i.e. above freezing and below excessive high temperatures, notwithstanding that the room status switch at the room status station is in an unoccupied position.

DESCRIPTION OF THE DRAWINGS

FIG. 1 is a schematic view of an individual room energy control system constructed according to the invention, and FIG. 2 is an enlarged portion of the control switch means contained in FIG. 1 and illustrates the placement of temperature responsive switches within the control circuit.

DETAILED DESCRIPTION OF THE PREFERRED EMBODIMENT

Referring to FIG. 1, there is illustrated an individual guest room 1 having therein a telephone 2 and an electrical load means 3 which may comprise an air conditioning unit or an electrical heating means or both. The electrical load is connected to an AC power source 4 by leads which include a relay operated control switch 5.

The room energy control system according to the invention includes a room status station 10 which may be located at the front desk of a hotel or motel and which is adapted to be operated by a room desk clerk to indicate the status of an individual room upon an indicator panel which would contain indicating means for indicating the status of a plurality of rooms. In the figure, the circuitry associated with only one individual room is illustrated, it being understood that similar circuitry would be included for each room. The room status station 10 includes a room status switch S1 which is closed when a guest checks out and a room is unoccupied. As explained in more detail hereafter, this will light a red indicating lamp R indicating that the room is unoccupied and in need of service. The maid upon entering the room operates the telephone which will illuminate a green lamp G to give an indication that the maid is in the room and servicing it. Upon completion of servicing the room, the maid again operates the telephone which will extinguish the red lamp R leaving the green lamp G on indicating that the room has been serviced and is ready for re-rental. Upon rental of the room, the switch S1 is opened extinguishing the green lamp G to indicate that the room is occupied.

The telephone 2 is connected by conventional tip and ring lines 20 and 21 by way of relay operated switches K1A and K1D to lines 22 and 23 which extend to a conventional telephone switchboard 24. Switches K1A and K1D are included in a room status control circuit 25 which includes a 32 volt power supply 26 such that when the switch S1 is closed a relay K1 is energized thus moving switches K1A and K1D to their dotted line positions disconnecting the telephone from the switchboard 24 and connecting it to the control circuit. At the same time relay operated switch K1B will move to its dotted line position thus making a circuit between the power supply 26, through switch K2A and the lamp R to illuminate the same to indicate that a room is unoccupied and is in the need of cleaning.

The maid upon entering a room may operate the telephone by lifting the receiver from its cradle to thus close the manually operated telephone service switch 27. This will then complete a circuit from the power supply 26 through switch K1A, the switch 27, switch K1D, relay K3 and back to the power supply to thus energize relay K3. Energization of relay K3 will cause relay operated switches K3A and K3B to move to their dotted line positions. This will then produce a circuit from the power supply 26 through the switch K3A, the lamp R and back to the power supply to maintain the lamp R illuminated. At the same time a circuit is completed from the power supply through the switch K3B, resistance R1, relay K2 back to the power supply. Energization of relay K2 will cause relay operated switches K2B, K2C and K2D to move to their dotted line positions. A circuit will then be completed from the power supply 26 through switch K3B, resistance R1 and the relay K2 back to the power supply. A further circuit is completed through switch K2C through the lamp G back to the power supply to illuminate the lamp G to indicate that a maid is in the room and servicing it.

The maid upon completion of service replaces the telephone receiver onto its cradle thus opening the manually operated switch 27. This in turn will deenergize relay K3 causing switches K3A and K3B to move to their full line positions. The circuit containing the lamp R will thus be broken allowing it the extinguish to leave only the green lamp illuminated thus indicating that a room has been serviced and is ready for re-rental. The circuit containing the lamp G will remain completed since relay K2 will remain energized through a circuit containing the diode CR1, switch K2B and resistance R1.

Upon re-rental of the room, the clerk opens the switch S1 allowing the relay K1 to deenergize to disconnect the telephone from the control circuit via switches K1A and K1D and to reconnect the telephone to the telephone switchboard 24. At the same time the circuit through diode CR1, switch K2B, resistance R1 and relay K2 is broken allowing deenergization of relay K2 whereby the switch K2C is opened to extinguish the lamp G.

The circuit as described above is conventional and of the type as illustrated in the aforementioned patents. While the system shown is operated by movement of the telephone receiver from its cradle, it is obvious that a manually dial operated switch could be substituted for the switch 27.

My invention contemplates adding an individual room energy control system to the status system as described above and which includes the use of conventional tip and ring lines 30 and 31 which are commonly strung to an individual room along with wires 20 and 21 in order to provide a second telephone connection if one is desired. My invention utilizes these lines to provide a connection between a 24 volt power supply 32 with the relay operated control switch 5 which contains a relay 33 for operating gang switch 34. Included in the room energy control circuit is a relay operated switch K1C which is operated status by energization of relay K1 and a further relay switch K3C which is operated by relay K3.

When a guest checks out and the switch S1 is closed, relay K1 will be energized as previously explained such that switch K1C will move to its dotted line position to complete a circuit between the 24 volt power supply 32 through switches K3C, K1C and then back to the power supply 32 to energize coil 33. Energization of coil 33 will cause the gang switch 34 to open to disconnect the electrical load in the individual room from the AC power source 4.

The maid upon entering the room and operating the telephone, energizes the relay K3 as previously explained which in turn will cause the service switch K3C to move to its dotted line position thus breaking the circuit containing relay 33. The deenergization of relay 33 allows the gang relay switch 34 to move again to its full line position to reconnect the electrical load to its AC power source 4. This will then allow the maid to have full use of the load facilities, i.e. heating or air conditioning, during the time that she is in the room servicing it. Upon completion and closure of the manually operated service switch 27, which acts as a manually operable service switch, relay K3 is deenergized allowing switch K3C to move to its full line position to again energize relay K3 to disconnect the load from its power source.

Referring to FIG. 2 the control relay 5 preferably includes temperature responsive switches 36 and 37 which are adapted to open at predetermined temperatures and which are sensitive to ambient room temperature. The switch 36 may comprise a low temperature responsive switch adapted to open at a predetermined low temperature which is some temperature above freezing, preferably about 55° F., which will open to deenergize the relay 33 allowing the load to connect with its power source notwithstanding that switch S1 is closed. This will assure that the room will maintain a minimum temperature above freezing when the electrical load comprises a heater.

Switch 37 preferably comprises a switch that will open upon a predetermined high temperature, on the order of 95° F., such that upon a room obtaining a predetermined high temperature, switch 37 will open to deenergize relay 33 to connect the load to its power source where the load comprises an air conditioner notwithstanding that switch S1 is in the closed position.

Thus it is seen that a system constructed according to my invention allows convenient individual control of energy consumption in a hotel or motel room by including a convenient means for disconnecting the electrical load from its power supply, by providing means by which the maid may have independent control over the system to reconnect the electrical load to its power supply and by providing temperature responsive switches which will automatically connect the electrical load to its power supply upon the attainment of predetermined temperature conditions. While the system as shown may utilize conventional telephone lines and particularly the second set of lines that are normally run to a room, it is apparent that in the case where only one set of telephone lines has been extended to a room, that conventional hard wire lines could be extended to the room to connect with the control relay and which could be incorporated with the conventional telephone system.

I claim:

1. An individual room energy control system for selectively connecting an individual room electrical load means to a power source, said system including:
A. A status circuit having:
1. An operator controlled room status switch located at a room status station by which the status circuit may be connected to a power supply, and
2. A manually operated service switch located within an individual room for selectively connecting a portion of the status circuit to a power supply, and
B. A control ciruit having:
1. A relay operated control switch for connecting said load means to said power source,
2. A relay operated status switch responsive to movement of said operator controlled room status switch and energization of said status circuit for connecting said control circuit to a power supply and causing said relay operated control switch to disconnect said load means from said power source, and
3. A relay operated service switch responsive to movement of said manually operated service switch for disconnecting said control circuit from said power supply and whereby said relay operated control switch will move to connect said load means to said power source.

2. An individual room energy control system according to claim 1, wherein said manually operated service switch is contained within a telephone having a hand set and a cradle connected by telephone wires to said room status station to form said part of a room status circuit, and wherein said relay operated service switch is responsive to use of said telephone.

3. An individual room energy control system according to claim 2 wherein said manually operated service switch closes when said hand set is removed from its cradle.

4. An indiviudal room energy control system according to claim 1 wherein said control circuit includes a high temperature responsive switch adapted to open when the temperature in the individual room exceeds a predetermined temperature and a low temperature responsive switch adapted to open when the temperature in said room falls below a predetermined temperature whereby opening of either of said temperature responsive switches breaks said control circuit to allow the individual room load means to be connected to its power source.

* * * * *